(12) United States Patent
Maritano et al.

(10) Patent No.: US 11,325,211 B2
(45) Date of Patent: May 10, 2022

(54) METHOD OF RESTORING A BLADE OR VANE PLATFORM

(71) Applicant: ANSALDO ENERGIA S.p.A., Genoa (IT)

(72) Inventors: Massimiliano Maritano, Genoa (IT); Alessio Andolfi, Genoa (IT)

(73) Assignee: ANSALDO ENERGIA S.P.A., Genoa (IT)

( * ) Notice: Subject to any disclaimer, the term of this patent is extended or adjusted under 35 U.S.C. 154(b) by 282 days.

(21) Appl. No.: 16/510,101

(22) Filed: Jul. 12, 2019

(65) Prior Publication Data

US 2020/0016703 A1 Jan. 16, 2020

(30) Foreign Application Priority Data

Jul. 13, 2018 (EP) .................................... 18425053

(51) Int. Cl.
B23P 6/00 (2006.01)
B33Y 10/00 (2015.01)
(Continued)

(52) U.S. Cl.
CPC ................ B23P 6/007 (2013.01); B23H 9/10 (2013.01); B23K 26/0093 (2013.01);
(Continued)

(58) Field of Classification Search
CPC .... B23K 26/0626; B23K 26/60; B23K 26/14; B23K 26/342; B23K 26/0884;
(Continued)

(56) References Cited

U.S. PATENT DOCUMENTS 8,640,942 B1    2/2014 Ozbaysal et al.
2011/0099810 A1   5/2011 Stankowski et al.
(Continued)

FOREIGN PATENT DOCUMENTS

EP    2317075 A2   5/2011
EP    3269930 A1   1/2018
(Continued)

OTHER PUBLICATIONS

Dutta, Bhaskar & Palaniswamy, S. & Choi, Juneho & Song, Lijun & Mazumder, Jyoti. (2011). Additive Manufacturing by Direct Metal Deposition. Advanced Materials and Processes. 169. 33-36. (Year: 2011).*

(Continued)

Primary Examiner — Joel M Attey
Assistant Examiner — Rachel R Rizzo
(74) Attorney, Agent, or Firm — Buchanan Ingersoll & Rooney PC

(57) ABSTRACT

A method for restoring a blade or vane platform of a gas turbine assembly configured for a power plant by: providing a blade or a vane having a platform with an edge deterioration zone; removing the deterioration zone by electro discharging machining technology; and rebuilding a removed zone by additive manufacturing technology. The removing can be performed to create a recessed plane along a platform edge, the recessed plane being connected to a platform plane by an enter inclined plane and an exit inclined plane arranged opposed along the platform edge.

16 Claims, 3 Drawing Sheets

(51) Int. Cl.
  *B33Y 80/00*   (2015.01)
  *B23K 26/144*  (2014.01)
  *B23K 26/342*  (2014.01)
  *B23H 9/10*    (2006.01)
  *B23K 26/00*   (2014.01)
  *B23K 26/06*   (2014.01)
  *B23K 26/08*   (2014.01)
  *F01D 5/00*    (2006.01)

(52) U.S. Cl.
  CPC ...... *B23K 26/0626* (2013.01); *B23K 26/0884* (2013.01); *B23K 26/144* (2015.10); *B23K 26/342* (2015.10); *B33Y 10/00* (2014.12); *B33Y 80/00* (2014.12); *F01D 5/005* (2013.01); *F05D 2230/31* (2013.01); *F05D 2230/80* (2013.01)

(58) Field of Classification Search
  CPC ............ B23K 26/0093; B23K 26/1476; B23K 26/34; B23K 26/144; B23K 35/3033; B23K 1/0018; B23K 26/3584; B23K 35/304; B23K 1/206; B23K 26/361; B23K 1/20; B23K 31/02; B23K 26/32; B23K 20/1205; B23K 20/16; B23K 9/167; B23K 10/027; B23K 9/048; B23K 9/173; B23K 5/18; B23K 35/308; B23K 35/0244; B23K 35/3086; B23K 35/007; B23H 9/10; B23H 1/00; B22F 5/04; B22F 10/20; B22F 7/08; B22F 7/062; B22F 5/009; B22F 3/24; B33Y 80/00; B33Y 10/00; B33Y 50/00; B33Y 40/00; B33Y 30/00; F01D 5/005; F01D 5/20; F01D 5/18; B23P 6/007; B23P 6/002; B23P 6/005; B23P 6/00; B23P 6/045; B23P 15/02; B23Q 17/2471; G05B 19/31; G05B 19/4097; B24B 19/14; C22C 19/056; F05D 2230/31; F05D 2230/80
  See application file for complete search history.

(56) References Cited

U.S. PATENT DOCUMENTS

| | | |
|---|---|---|
| 2016/0069196 A1 | 3/2016 | Huxol et al. |
| 2016/0146014 A1 | 5/2016 | Connor et al. |
| 2017/0239719 A1* | 8/2017 | Buller .................. B23K 26/032 |
| 2018/0010465 A1 | 1/2018 | Xu |

FOREIGN PATENT DOCUMENTS

| | | | | |
|---|---|---|---|---|
| GB | 2532605 A | * | 5/2016 | ............... B23H 9/10 |
| GB | 2532605 A | | 5/2016 | |

OTHER PUBLICATIONS

European Search Report for EP 18425053.8 dated Nov. 13, 2018.
Wikipedia: "Gladding (metalworking)", Jun. 23, 2018, retrieved from the Internet: https://en.wikipedia.org/w/index.php?title=Cladding_(metalworking)&oldid=847128002 (4 pages).

* cited by examiner

METHOD OF RESTORING A BLADE OR VANE PLATFORM

CROSS-REFERENCE TO RELATED APPLICATIONS

This patent application claims priority from European patent application no. 18425053.8 filed on Jul. 13, 2018, the entire disclosure of which is incorporated herein by reference.

FIELD OF THE INVENTION

The present invention relates to the technical field of the gas turbine assemblies for power plants. In particular, the present invention relates to a method for restoring or repairing a deteriorated platform of a turbine blade or vane. Therefore, more in detail, the technical field of the present invention relates to the so called "gas turbine service" that is a very competitive market in permanent evolution. In view of the above, it is essential to offer a high productivity and quality in repaired products.

DESCRIPTION OF PRIOR ART

As known, a gas turbine assembly for power plants (in the following only gas turbine) comprises a rotor provided with an upstream compressor unit, at least a combustor unit and at least a downstream turbine unit. The terms downstream and upstream refer to the direction of the main gas flow passing through the gas turbine. In particular, the compressor is configured for compressing air supplied at a compressor inlet. The compressed air leaving the compressor flows into a plenum and from there into a combustor. The combustor comprises a burner wherein the compressed air is mixed with at least one fuel. The mixture of fuel and compressed air flows into a combustion chamber where this mixture is combusted. The resulting hot gas leaves the combustor chamber and is expanded in the turbine performing work on the rotor. The turbine comprises a plurality of stages, or rows, of rotor blades that are interposed by a plurality of stages, or rows, of stator vanes. The rotor blades are connected to the rotor whereas the stator vanes are connected to a vane carrier that is a concentric casing surrounding the turbine unit.

In service, turbine blades or turbine vanes are prone to platform deterioration, in particular platform edges deterioration, as a result of hot corrosion due to high temperature of the hot gas passing along the platform outer surface. Some cracks can also be formed on the platform outer surface due to the so called thermomechanical fatigue. If damages or a deteriorated platform zone are found, the blade platform has to be repaired. The standard method for repairing the platform is to remove the deteriorated zone, i.e. a layer of the platform outer surface at the deteriorated zone, and rebuilt it by welding. In particular, in order to repair a rotor blade and stator vane platform today the most used welding method is the tungsten inert gas welding to carry out rotor blade and stator vane restoration. However, tungsten inert gas welding has a large heat affected zone, which can later lead to gross distortion due the high thermal input and loss of structural integrity of the repaired part. The most recent repair technique involves the use of laser cladding technology for rebuilding the damaged areas and restore the platform to the original shape. The laser cladding process is an automated welding process that requires a prior precise preparation of the area, on which the clad will be welded. This preparation of the area, i.e. the removal of the deteriorated zone of the platform, is usually carried out by a milling operation along the whole length of the platform edge. Unfortunately, this kind of preparation is time consuming and limits the extension of the potential reparability area.

Alternative methods consist of manual preparation and a manual repair. However, manual preparation is not precise, not always repeatable and frequently can lead to defects like porosity or lack of fusion.

EP1563945 and US20070163115 are two prior art documents disclosing methods for repairing a blade or vane platform comprising first the step of removing the deteriorated zone and after the step of rebuilding the platform by adding new material in the removed zone. However, these prior art documents neither disclose nor suggest any particular shape to be done to the removed zone in order to improve the following step of rebuilding.

DISCLOSURE OF THE INVENTION

Accordingly, a primary object of the present invention is to provide an improved method for restoring or repairing a blade or vane platform, in particular a turbine blade or vane platform, of a gas turbine assembly for power plant. This method is suitable for improving the known methods and for overcoming the problems foregoing described of the prior art practice. In particular, the general scope of the present invention is to realize a method wherein the removing step of the deteriorated area can optimize the rebuilding step, wherein the method is repeatable and permits to avoid all the defects that can compromise the integrity of the part during the engine operation.

In order to achieve the objective scopes mentioned above, the present invention provides a method for restoring a blade or vane platform of a gas turbine assembly for power plant; the method comprising the steps of:
a) providing a blade or a vane of a gas turbine assembly for power plant; wherein the blade or vane comprises a platform having a deteriorated edge zone;
b) removing part of the outer platform surface comprising the deteriorated zone by means of electro discharging machining technology;
c) rebuilding the removed zone by means of additive manufacturing technology.

In particular, according to the main feature of the invention, the step b) is configured to create a particular shape of the removed zone that can optimize the next rebuilding step. In details, the removed zone according to the present invention comprises a main recessed plane arranged along at least a portion of the platform edge (i.e. the trailing or leading edge). Moreover, according to the present invention the main recessed plane is connected to the platform outer surface (i.e. the remaining part the platform outer surface not affected by deteriorations) by an enter inclined plane and an exit inclined plane opposite arranged along the platform edge.

Advantageously, by realizing the recessed zone as above described (main recessed plane and two angled planes) with the electro discharging machining technology before the rebuilding step, it is possible to reach a high rebuilding quality avoiding the usual problems related to the laser cladding technology, i.e. the presence of porosity or cracks. In particular, the Applicant also identified some preferred parameters about the angles between the main and the angled recessed planes and about the rebuilding parameters of the additive manufacturing technology.

Preferably, the step of rebuilding the removed zone by means of additive manufacturing technology is performed by a five axes laser metal deposition technology.

Preferably, filler metal material is delivered in powder form.

Preferably, the laser energy density is between 2000 J/cm$^2$ and 5000 J/cm$^2$, more preferably between 3000 J/cm$^2$ and 4000 J/cm$^2$.

Preferably, the powder feed rate is configured to recreate the clad shape with an aspect ratio length/height between 3 and 6 and with an adhesion angles between 120° and 130°.

As foregoing cited, the step of removing the deteriorated zone by means of electro discharging machining technology is performed so that an angle is realized between the recessed plain and the enter and exit inclined plane. Preferably, this enter and exit angle is between 130° and 150°. Moreover, the recessed plane and the enter/exit inclined planes are joined through a fillet radius preferably between 5 mm and 8 mm.

According to the invention, the length along the platform edge of the removed zone is equal or less than the length of the platform edge.

Finally, the method comprises also a final step of blending or machining the rebuilt zone.

It is to be understood that both the foregoing general description and the following detailed description are exemplary, and are intended to provide further explanation of the invention as claimed. Other advantages and features of the invention will be apparent from the following description, drawings and claims.

The features of the invention believed to be novel are set forth with particularity in the appended claims.

BRIEF DESCRIPTION OF DRAWINGS

Further benefits and advantages of the present invention will become apparent after a careful reading of the detailed description with appropriate reference to the accompanying drawings.

The invention itself, however, may be best understood by reference to the following detailed description of the invention, which describes an exemplary embodiment of the invention, taken in conjunction with the accompanying drawings, in which.

DETAILED DESCRIPTION OF PREFERRED EMBODIMENTS OF THE INVENTION

Figure 1:
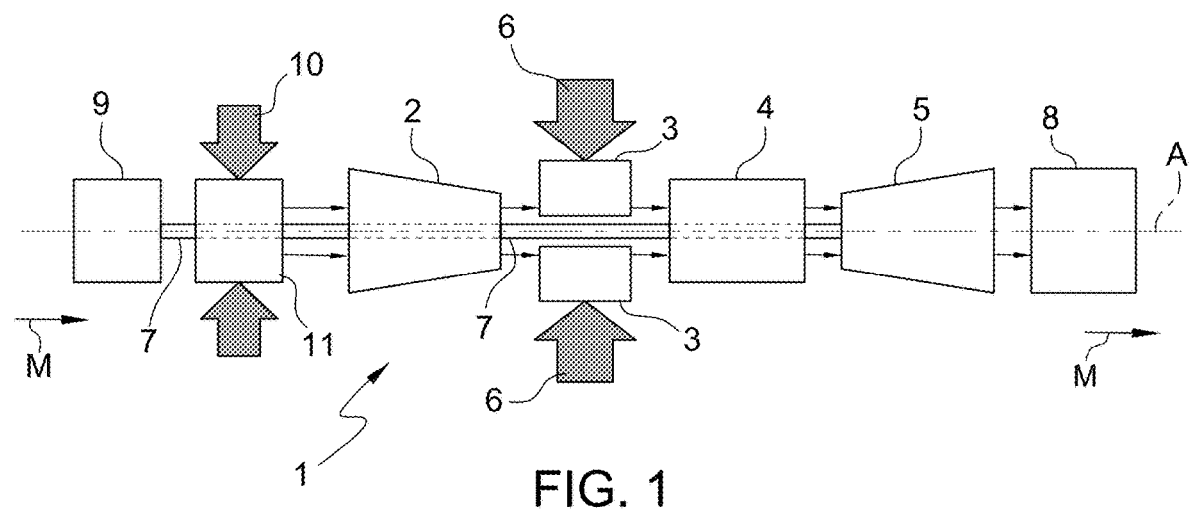
FIG. 1 is a schematic view of a gas turbine assembly for power plants.

In cooperation with attached drawings, the technical contents and detailed description of the present invention are described thereinafter according to preferred embodiments, being not used to limit its executing scope. Any equivalent variation and modification made according to appended claims is all covered by the claims claimed by the present invention.

Reference will now be made to the drawing figures to describe the present invention in detail.

Reference is made to FIG. 1 which is a schematic view of a gas turbine assembly for power plants (in the following only gas turbine). FIG. 1 discloses a gas turbine 1 having an axis A and comprising in series along the main flow M:

a compressor section 2, provided with an intake 11 for feeding air 10, a combustor section, provided with at least a burner unit 3; each burner being provided with a plurality of fuel nozzles 6 and being connected to a relative combustion chamber 4 wherein the compressed air is mixed with at least a fuel and this mixture is burnt to create a hot gas flow, a turbine section 5 where the hot gas flow expands performing work on a rotor 7.

Figure 2:
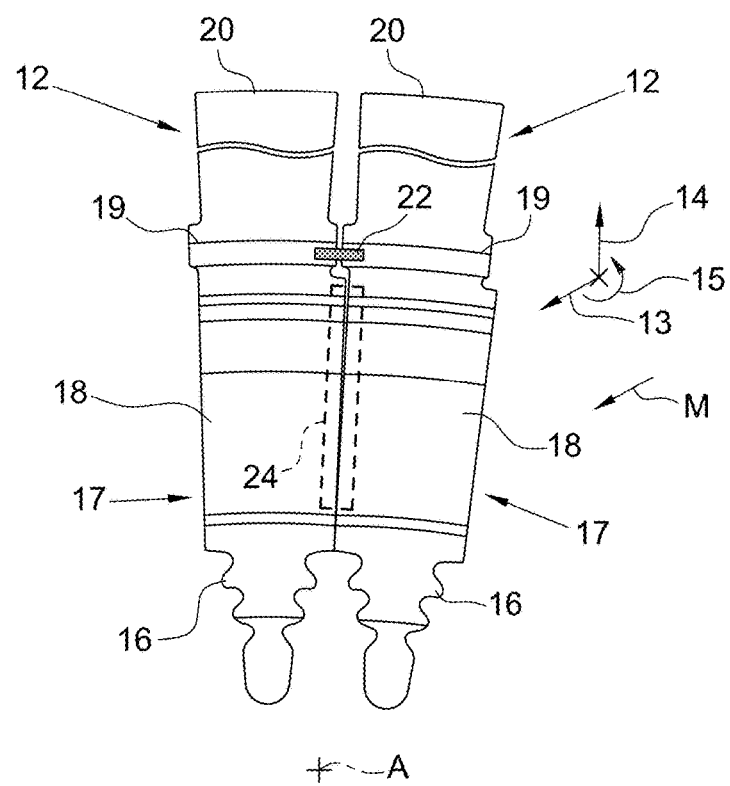
FIG. 2 is a schematic view of two adjacent turbine blades of the gas turbine of FIG. 1.

Preferably, the rotor 7 is single piece of a plurality of rotor wheels welded together and extends from the compressor 2 to the turbine 5. As known, the combustor section can be provided with a single annular combustor or a plurality of can combustors. The exhaust gases leaving the turbine can be used, for instance, in a steam generator and the rotor 7 can be connected to load 9, i.e. an electrical generator in a power plant. As known, the compressor 2 and the turbine 5 comprises a plurality of stator vanes and a plurality of rotating blades. These rotating blades are connected to the rotor 7 and arranged in parallel circumferential rows centered in the axis A. Reference is made to FIG. 2 that is a schematic view of adjacent blades of the gas turbine of FIG. 1, in particular FIG. 2 refers to adjacent turbine blades 12. In particular, FIG. 2 discloses a legend of the main directions of the gas turbine field. In this legend the reference 13 refers to the axial direction that is parallel to the rotor 7, to the axis A and in general to the hot gas flow direction M. The terms downstream and upstream refer to the axial direction 13 along the hot gas flow direction M. The reference 14 refers to the radial direction centered in the axis A; the terms inner/inwardly and outer/outwardly refer to the distance from the axis A along the radial direction 14. The reference 15 refers to the circumferential direction centered in the axis A. FIG. 2 discloses an axial downstream view of two adjacent turbine blades 12 of a common row of blades. Blades 12 may be constructed of a metal, metal alloy, ceramic matrix composite (CMC), or other suitable material. Starting from the axis A and along the radial direction 14 each blade 12 comprises a foot 16 configured to be coupled with the rotor 7, a shank portion 17 provided with downstream or closing wall 18, a platform 19, and an airfoil 20. The channel for the hot gas is limited inwardly by the platforms and outwardly by the outer casing in form of a plurality a tales called heat shields. At the shank portion 17 between two adjacent blades a cavity is present, in particular a cooling air cavity. This cavity is outwardly limited along the radial direction 14 by the adjacent edges of the platforms 19 and downstream along the axial direction 13 by the adjacent edges of the closing walls 18. As known, in order to avoid losses of efficiency of turbine engine, the gap between two adjacent platforms 19 has to be sealed both in radial direction, i.e. to avoid leakages passing to the gap present between the adjacent platforms 19, and in axial direction, i.e. to avoid leakages passing to the gap present between the closing walls 18. The above axial and radial sealing are schematically represented in FIG. 2 with the reference 22 and 24.

Even if the platform 19 (i.e. the inner face of the blade platform) is cooled as foregoing described, the outer surface of the platform is exposed to very high temperature due to the presence of the hot gas passing through the turbine. Due to this high temperature, the leading and the trailing platform edge are prone to deterioration in form of a corrosion or cracks due to thermomechanical fatigue.

Once the deteriorated platform edge has been identified, the method of the present invention comprises the step of removing the deteriorated zone of the platform edge by means of electro discharging machining technology.

Figure 3:
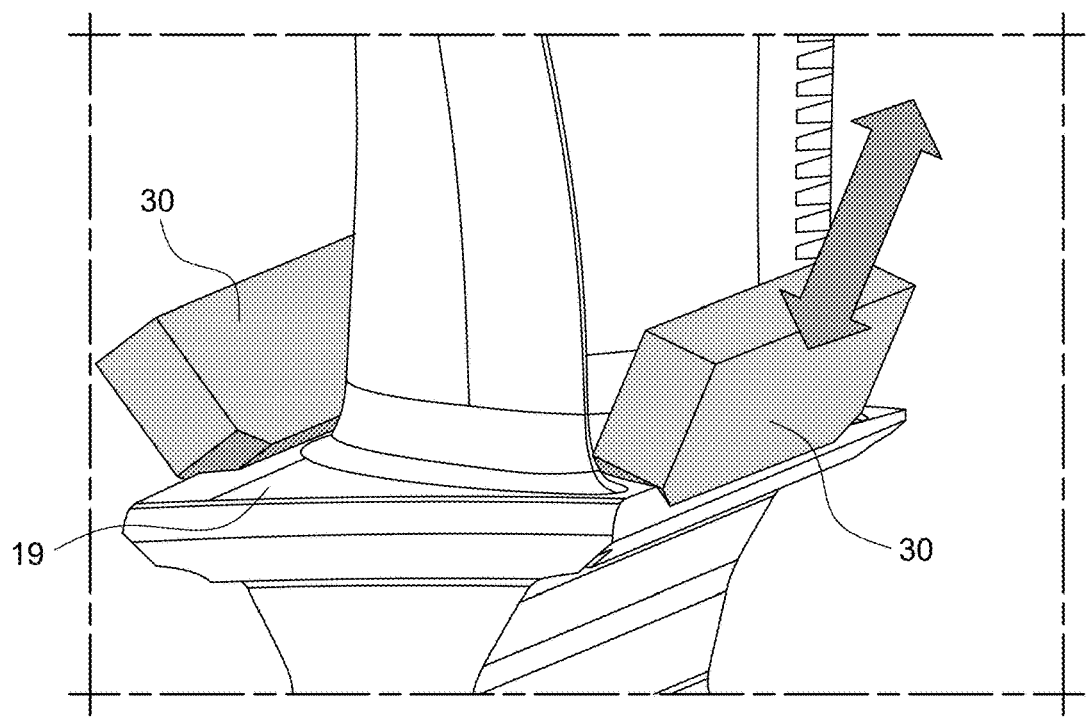
FIG. 3 is a schematic view of the step of removing the deteriorated zone of the present invention.

FIG. 3 discloses schematically this step of removing the deteriorated zone of the platform edge wherein the reference 30 refers to an electro discharging machining tool working on the deteriorated platform edge.

Figure 4:
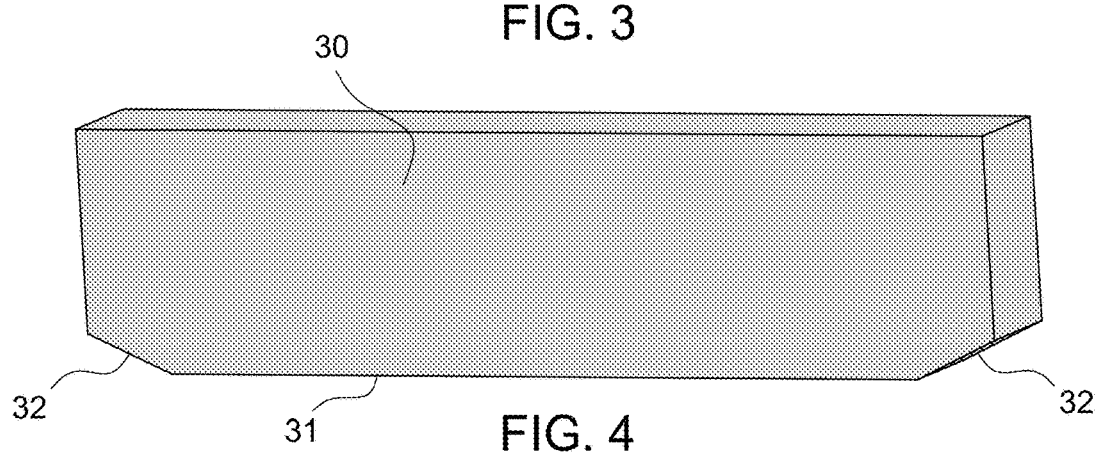
FIG. 4 is a schematic view of the electro discharging machining tool used in the present invention suitable for realizing a recessed zone on the platform.

As disclosed in FIG. 4, the electro discharging machining tool 30 comprises a working surface comprising a straight plane surface 31 (in FIG. 3 acting along the platform edge) and two opposite angled plane surfaces 32. The length of the straight plane surface 31 can be varied in order to be applied only on the deteriorated zone and not necessary on the entire length of the platform edge.

Figure 5:
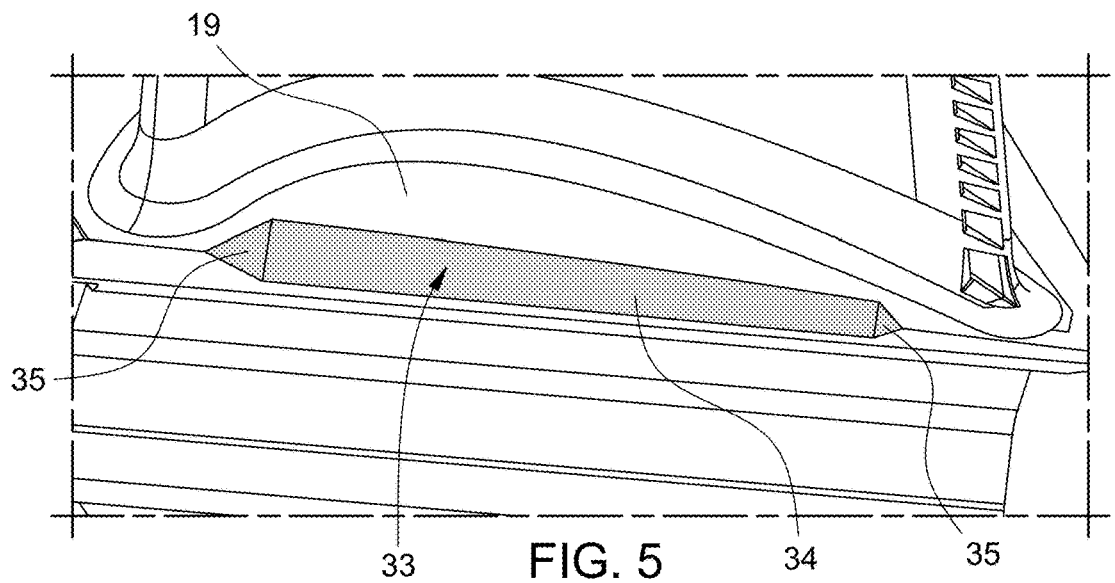
FIGS. 5 and 6 are schematic views of the recessed zone realized in the blade platform by using the tool of FIG. 5.
Figure 6:
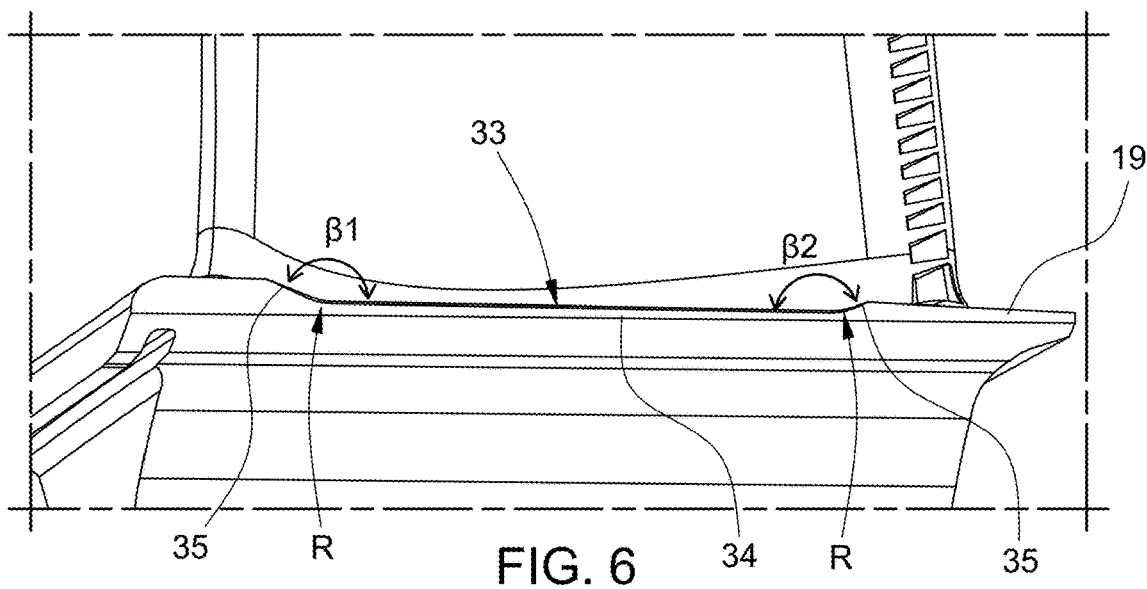

FIG. 5 discloses the recessed zone that can be realized on the platform edge by using the tool 30 of the previous FIG. 4. This FIG. 5 discloses a recessed zone 33 comprising a main recessed plane 34, realized by the straight plane surface 31 of the tool 30, and two angled opposite planes 35 realized by the angled plane surfaces 32 of the tool 30. These angled opposite planes 35 connect the main recessed plane 34 to the platform outer face. The main recessed plane 34 can be parallel to the outer platform surface or can be angled depending on the presence of a working angle between the tool 30 and the platform blade. The mentioned two angled opposite planes 35 can be also called as "enter" inclined plane and "exit" inclined plane because represent the starting and the ending point of the rebuilding step of the present invention. As disclosed in FIG. 6, preferably the angles $\beta_1$ and $\beta_2$ between the recessed main plane 34 and the enter and exit inclined plane 35 are between 130° and 150°. Moreover, the recessed main plane 34 and the enter and exit inclined plane 35 are joined through a fillet radius R between 5 mm and 8 mm.

Figure 7:
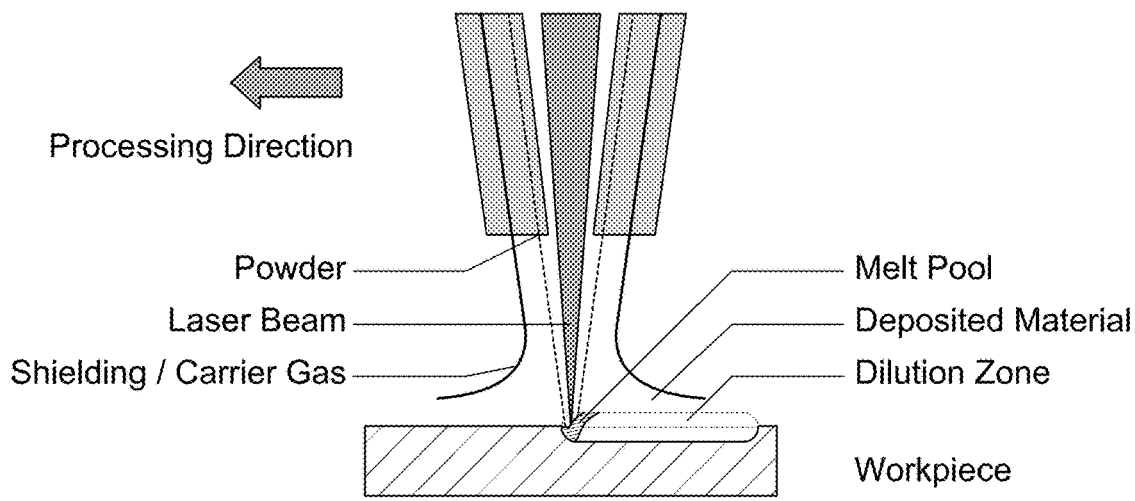
FIG. 7 is a schematic view of the step of rebuilding the removed zone according to the present invention.

FIG. 7 discloses the rebuilding step of the removed zone by means of additive manufacturing technology. In particular, this step is performed by using a five axes laser metal deposition technology wherein the filler metal material is delivered in powder form. Preferably, the laser energy density is between 2000 J/cm² and 5000 J/cm², more preferably between 3000 J/cm² and 4000 J/cm².

As known, the laser energy density is defined by the following equation wherein P is Laser Power, V is the scan velocity and D the Spot Laser diameter.

$$E = \frac{P}{v \cdot d}\left[\frac{J}{cm^2}\right]$$

Figure 8:
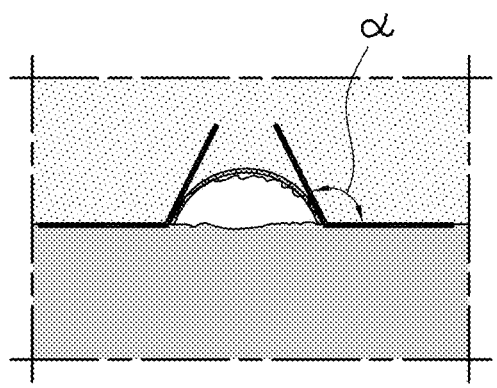
FIGS. 8 and 9 are schematic views of the clad realized by using the technic of rebuilding of FIG. 7.
Figure 9:
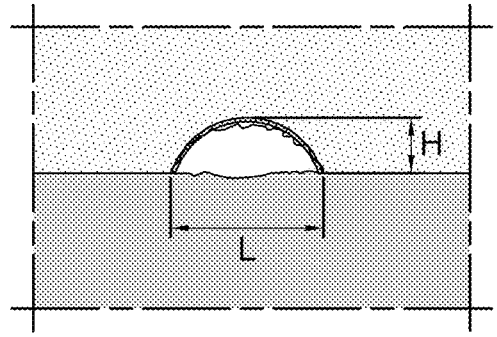

As disclosed in the last two FIGS. 8 and 9, the clad shape realized by using the method of the present invention discloses a ratio length/height (L/H) between 3 and 6 and an adhesion angles a between 120° and 130°.

Although the invention has been explained in relation to its preferred embodiment(s) as mentioned above, it is to be understood that many other possible modifications and variations can be made without departing from the scope of the present invention.

In general, the present invention allows to repair the critical area of blade and vane platforms using the new laser metal deposition technology avoiding and eliminating the problems related to laser cladding process and increasing the repairability of parts also in critical areas such as the platform wedge faces, where the geometrical constraints of the repairable areas highly limit the use of the manual process. According to the invention a designed and optimized geometries are used during the removing step for the preparation before the rebuilding step. The invention allows to reach outstanding repair quality level by automatic method and very well controlled thermal input. The invention overcomes the following usual problems related to the laser cladding:

the presence of porosity due to not optimized laser parameters that lead to a bad clad shape and not properly prepared rebuilding surfaces, in terms of angles between adjacent surfaces and fillet radii.

the presence of cracks due to very high residual stresses generated by wrong process parameters.

This aspect is particularly pronounced and easily to be found in Nickel based superalloy (usual base material for turbine blades and vanes).

Moreover, the method of the invention can be applied to both blades and vanes platform geometries and doesn't necessary involves all the platform edges, but can be highly customized depending on the extension and the position of the defects in order to reduce the time and the costs for the repair. The invention minimizes the removal of blade or vane material reducing the impact of the repair on the base material and component strength. The invention allows to reaches an high flexibility, repeatability and selectivity of this automated process result in better quality products but also offer significant economic benefits.

It is, therefore, contemplated that the appended claim or claims will cover such modifications and variations that fall within the true scope of the invention.

The invention claimed is:

1. A method for restoring a blade or vane platform of a gas turbine assembly configured for a power plant; the method comprising:
    a) providing a blade or a vane of a gas turbine assembly configured for the power plant, wherein the blade or vane includes a platform having a deteriorated edge zone;
    b) removing the deteriorated edge zone by electro discharging machining technology to create a removed zone; and
    c) rebuilding the removed zone by additive manufacturing technology, wherein the removing b) is performed to create a recessed main plane along a platform edge, the recessed main plane being connected to a platform outer surface by an enter inclined plane and an exit inclined plane arranged opposed along the platform edge, an angle between the recessed main plane and the enter and exit inclined planes is between 130° and 150°.

2. The method as claimed in claim 1, wherein the rebuilding c) is performed by using a five axes laser metal deposition technology.

3. The method as claimed in claim 2, comprising:
    delivering, during the rebuilding c), filler metal material in powder form.

4. The method as claimed in claim 2, wherein during the rebuilding c), a laser energy density is between 2000 J/cm² and 5000 J/cm².

5. The method as claimed in claim 4, wherein during the rebuilding c), the laser energy density is between 3000 J/cm$^2$ and 4000 J/cm$^2$.

6. The method as claimed in claim 5, comprising:
selecting, during the rebuilding c), a powder feed rate to recreate a clad shape with an aspect ratio length/height between 3 and 6 and adhesion angles between 120° and 130°.

7. The method as claimed in claim 1, wherein a length of the removed zone is equal to or less than a length of the platform edge.

8. The method as claimed in claim 1, comprising:
blending or machining the rebuilt zone.

9. A method for restoring a blade or vane platform of a gas turbine assembly configured for a power plant; the method comprising:
 a) providing a blade or a vane of a gas turbine assembly configured for the power plant, wherein the blade or vane includes a platform having a deteriorated edge zone;
 b) removing the deteriorated edge zone by electro discharging machining technology to create a removed zone; and
 c) rebuilding the removed zone by additive manufacturing technology, wherein the removing b) is performed to create a recessed main plane along a platform edge, the recessed main plane being connected to a platform outer surface by an enter inclined plane and an exit inclined plane arranged opposed along the platform edge, an angle between the recessed main plane and the enter and exit inclined planes is between 130° and 150°, and the recessed main plane and the enter and exit inclined planes are joined through a fillet radius of between 5 mm and 8 mm.

10. The method as claimed in claim 9, wherein the rebuilding c) is performed by using a five axes laser metal deposition technology.

11. The method as claimed in claim 10, comprising:
delivering, during the rebuilding c), filler metal material in powder form.

12. The method as claimed in claim 10, wherein during the rebuilding c), a laser energy density is between 2000 J/cm$^2$ and 5000 J/cm$^2$.

13. The method as claimed in claim 12, wherein during the rebuilding c), the laser energy density is between 3000 J/cm$^2$ and 4000 J/cm$^2$.

14. The method as claimed in claim 13, comprising:
selecting, during the rebuilding c), a powder feed rate to recreate a clad shape with an aspect ratio length/height between 3 and 6 and adhesion angles between 120° and 130°.

15. The method as claimed in claim 9, wherein a length of the removed zone is equal to or less than a length of the platform edge.

16. The method as claimed in claim 9, comprising:
blending or machining the rebuilt zone.

\* \* \* \* \*